US012533059B2

(12) United States Patent
Fang et al.

(10) Patent No.: US 12,533,059 B2
(45) Date of Patent: Jan. 27, 2026

(54) METHOD AND SYSTEM FOR IMPROVING MEASUREMENT ACCURACY OF MEASUREMENT SYSTEM

(71) Applicant: SHENZHEN NARIG BIO-MEDICAL TECHNOLOGY CO., LTD., Shenzhen (CN)

(72) Inventors: Jin Fang, Shenzhen (CN); Xiaocui Zhang, Shenzhen (GD)

(73) Assignee: Shenzhen Narig Bio-Medical Technology Co., Ltd., Guangdong (CN)

( * ) Notice: Subject to any disclaimer, the term of this patent is extended or adjusted under 35 U.S.C. 154(b) by 987 days.

(21) Appl. No.: 17/596,990

(22) PCT Filed: Jun. 25, 2019

(86) PCT No.: PCT/CN2019/092727
§ 371 (c)(1),
(2) Date: Dec. 22, 2021

(87) PCT Pub. No.: WO2020/258022
PCT Pub. Date: Dec. 30, 2020

(65) Prior Publication Data
US 2022/0313125 A1    Oct. 6, 2022

(51) Int. Cl.
*A61B 5/1455* (2006.01)
*A61B 5/00* (2006.01)
(Continued)

(52) U.S. Cl.
CPC ........ *A61B 5/14551* (2013.01); *A61B 5/0205* (2013.01); *A61B 5/0261* (2013.01);
(Continued)

(58) Field of Classification Search
CPC . A61B 5/14551; A61B 5/0205; A61B 5/0261; A61B 5/7203; A61B 5/02116;
(Continued)

(56) References Cited

U.S. PATENT DOCUMENTS

| 5,954,644 A | 9/1999 | Dettling et al. |
| 2001/0005773 A1* | 6/2001 | Larsen ............... A61B 5/14551 600/323 |

(Continued)

FOREIGN PATENT DOCUMENTS

| CN | 201104882 Y | * | 8/2008 |
| CN | 101455567 A | | 6/2009 |

(Continued)

OTHER PUBLICATIONS

English Translation of CN 201104882 Y, Neusoft Medical Systems Co Ltd, 7 pages, printed Jan. 11, 2025, (Year: 2011).*

*Primary Examiner* — Devin B Henson
*Assistant Examiner* — Jennifer Grace Baires-Tweed
(74) *Attorney, Agent, or Firm* — Rosenberg, Klein & Lee

(57) ABSTRACT

The method for improving measurement accuracy of a measurement system includes: emitting, by a light-emitting unit, at least one light signal to penetrate a human tissue; receiving, by a photoelectric conversion unit, the at least one light signal emitted by the light-emitting unit after penetrating the human tissue, and converting the at least one light signal into an electrical signal; converting, by a analog-to-digital conversion unit, the electrical signal into a digital signal; optimizing, by a signal-to-noise ratio optimization module, a signal-to-noise ratio of the digital signal by establishing at least one of a plurality of logic strategies; adjusting, by the driving adjustment unit, a magnitude of a driving current of the light-emitting unit base on the adjustment coefficient; and performing, by an algorithm processing unit, a physiological parameter conversion and calcula- (Continued)

tion based on the digital signal processed by the at least one logic strategy.

19 Claims, 7 Drawing Sheets

(51) Int. Cl.
    *A61B 5/0205*     (2006.01)
    *A61B 5/021*     (2006.01)
    *A61B 5/026*     (2006.01)
    *A61B 5/26*     (2021.01)

(52) U.S. Cl.
    CPC ......... *A61B 5/7203* (2013.01); *A61B 5/02116* (2013.01); *A61B 5/742* (2013.01)

(58) Field of Classification Search
    CPC ..... A61B 5/742; A61B 5/7228; A61B 5/0816; A61B 5/02433; A61B 5/14552; A61B 5/6826; A61B 5/725
    See application file for complete search history.

(56) References Cited

U.S. PATENT DOCUMENTS

2011/0237911 A1*   9/2011   Lamego ............... G01N 21/314
                                                                600/323
2019/0131009 A1     5/2019   Som et al.

FOREIGN PATENT DOCUMENTS

| CN | 101933811 A | 1/2011 |
| --- | --- | --- |
| CN | 102499694 A | 6/2012 |
| CN | 103027691 A | 4/2013 |
| CN | 103860180 A | 6/2014 |
| CN | 104095640 A | 10/2014 |
| CN | 106580339 A | 4/2017 |
| CN | 109011148 A | 12/2018 |
| CN | 109657658 A | 4/2019 |
| CN | 109863703 A | 6/2019 |

* cited by examiner

METHOD AND SYSTEM FOR IMPROVING MEASUREMENT ACCURACY OF MEASUREMENT SYSTEM

CROSS-REFERENCE TO RELATED APPLICATIONS

This application is a 371 of International Application No. PCT/CN2019/092727, filed Jun. 25, 2019, the entire contents of which are incorporated herein by reference.

TECHNICAL FIELD

The present application relates to the technical field of oximetry, and more particular to a method and a system for improving a measurement accuracy of a measurement system.

BACKGROUND

As the most important energy to sustain life, oxygen is one of the most basic elements of human health, just like food and water. Hypoxia is an imbalance between the body's oxygen supply and the body's oxygen consumption, that is, the tissue cell metabolism is in a state of hypoxia. Whether the body is hypoxic or not depends on whether the amount of the transport oxygen and the reserve amount of oxygen received by the tissues can meet the needs of aerobic metabolism. The hazards of hypoxia are related to the degree, rate and duration of hypoxia. Hypoxia has a huge impact on the body, such as the impact on the central nervous system (CNS), the liver and the kidney. The first thing that appears during hypoxia is compensatory heart rate acceleration, increased heart beat, increased cardiac output, and a compensation of the circulatory system for the lack of oxygen content with a high dynamic state. At the same time, a redistribution of blood flow and a selective expansion of the brain and coronary blood vessels occur to ensure an adequate blood supply. However, in severe hypoxic conditions, due to an accumulation of subendocardial lactic acid and a reduce in adenosine triphosphate (ATP) synthesis, the myocardial inhibition is produced, leading to bradycardia, premature contractions, a reduced blood pressure and a reduced cardiac output, and arrhythmia such as ventricular fibrillation and even the stop of the pulse. Severe hypoxemia is a common cause of death from anesthesia, accounting for about ⅓ to ⅔ of death from cardiac arrest or severe brain cell damage.

Therefore, the monitoring of oxygen in the clinic is crucial, which is directly related to the safety of patients' lives. Physiologically, the body's transport and metabolism of oxygen are completed by the combination and decomposition of hemoglobin (Hb) in the blood and oxygen. Therefore, the combination of oxygen and hemoglobin (HbO2) determines whether the body's oxygen reserves are sufficient. In a common method in clinical practice, the body's oxygen content is evaluated according to the percentage of oxygenated hemoglobin in total hemoglobin that can be combined, that is, oxygen saturation (SpO2). Since the invention of oxygen saturation measurement technology in the 1970s, the monitoring of the oxygen saturation parameters has been important increasingly day by day, and it has now become one of the essential monitoring parameters for major medical systems and health systems.

The basic principle of oxygen saturation monitoring is the Lamb-Beer light absorption law, in which oxyhemoglobin and hemoglobin are respectively absorbed through red light and infrared light with specific wavelengths, and then a ratio of infrared light absorption to red light absorption is further measured, thereby calculating the oxygen saturation. A light-emitting tube is mounted on one side of a tissue to be measured, to emit the red light and the infrared light to illuminate a portion to be measured. A photoelectric converter is mounted on the other side of the tissue to be measured, to convert the detected red light and the infrared light through the tissue to be measured into electrical signals. The concentrations of HbO2 and Hb in the arterial blood flow periodically change with the fluctuation of the blood artery, causing the signal intensity output by the photoelectric converter to also periodically change. By processing these periodically changing signals, the corresponding oxygen saturation and periodic pulse information can be calculated. As shown in FIG. 1, provided is a schematic diagram of signal acquisition. A filling volume of blood perfusion directly reflects the signal strength of the acquisition system.

The accuracy of oxygen saturation measurement may affect the judgment of medical staff, and even lead to a delay in treatment of patients, resulting in a serious life-threatening event. For example, a false positive event: the oxygen saturation is very low physiologically, while the measured oxygen saturation value is very high. In this circumstance, the medical staff may not pay attention because they mistakenly believe that the patient is in a normal state, and passively put the patient in a hypoxic state, resulting in different degrees of damage to the body tissues, and even life-threatening. A false negative event: the oxygen saturation is high physiologically, while the measured oxygen saturation value is very low. In the neonatal patient population, excessive oxygen ventilation therapy may cause retinopathy, which may also cause irreversible tissue damage in the patient.

The clinical factors that affect the accuracy of oxygen saturation measurement are mainly divided into a physiological dimension and a technical dimension.

In the physiological dimension, the peripheral blood volume is low mainly due to the patient's physiological state, which in turn leads to weak physiological signals obtained by the measurement system, and causes the blood oxygen related parameters calculated by the measurement system to be inaccurate, that is, the signal-to-noise ratio does not meet a design requirement of the measurement system. For example, hypothermia, venous embolism, and brachial plexus block lead to a low perfusion level of local block, and poor peripheral blood circulation is caused by abnormalities of important organs such as low volume, low cardiac output and shock.

In the technical dimension, the accuracy of oxygen saturation measurement is mainly determined by a design architecture, an application environment and an application mode of the measurement system. The design architecture of system includes hardware, software and algorithms. The design of each link directly or indirectly affects the measurement accuracy of the system. Application environment refers to a common operating environment in clinical applications, such as: incandescent lamp illumination environment, blue light illumination environment, surgical lamp illumination environment, and movement interference caused by the patient's active or passive activities. The application mode mainly refers to a wearing mode, a type selection, and a mode setting selection of the accessories used by the medical staff. The application mode is the operating specification constraint of the medical staff, which can generally be solved through the education and training for the user, so it is not described as a focus in the present invention.

A system or a device capable of monitoring the oxygen saturation is generally called an oximetry system or an oximeter. Generally speaking, the oximeter includes at least one oximetry system, which can not only monitor oxygen saturation parameters, but also provide physiological parameters in other dimensions, such as Pulse Rate (PR), Perfusion Index (PI), Respiration Rate (RR) and Perfusion Variety Index (PVI).

Few existing mainstream manufacturers of oxygen parameter measurement can comprehensively consider an entire measurement system to optimize the design. Either the cost of the measurement system is extremely high and the design is particularly complicated, or the measurement performance cannot meet the requirements, and the measurement is abnormal or failed in some extreme application scenarios. Masimo, an industry benchmark who focuses on oxygen parameters measuring, has developed as many as five parallel algorithms and decision-making systems based on an adaptive algorithm described in U.S. Pat. No. 6,263,222. Although Masimo's technology has largely solved the problem of inaccurate measurements in the clinic, the complexity of its technology has led to high system costs and high maintenance costs. For these reason, it does not occupy a high market share in important markets such as Europe, Africa, Asia, and South America. Other manufacturers who focus on oxygen parameters measuring, such as Nellcor and Mindray, have poor performance in hypothermia patients, weight infants, and dying patients due to the flaws in their system design, failing to meet the requirements for accurate clinical measurements. For Mindray, although it uses the industry's advanced TI sampling integrated chip AFE series, due to the irrationality of its system design, its measurement accuracy gradually deviates, or even fails to measure when the perfusion index is lower than 0.1%, which seriously affects the application of common special scenes in clinical practice.

Therefore, it is urgent to develop the existing technology.

SUMMARY

There are provided a method and a system for improving a measurement accuracy of a measurement system according to embodiments of the present disclosure. The technical solution is as below:

According to a first aspect of embodiments of the present disclosure, there is provided a method for improving a measurement accuracy of a measurement system, applied to an oximetry system, which comprises a light-emitting unit, a photoelectric conversion unit, an analog-to-digital conversion unit, a driving adjustment unit and an algorithm processing unit, wherein the analog-to-digital conversion unit comprises signal-to-noise ratio optimization module, the method comprising:

emitting, by the light-emitting unit, at least one light signal to penetrate a human tissue; receiving, by the photoelectric conversion unit, the at least one light signal emitted by the light-emitting unit after penetrating the human tissue, and converting the at least one light signal into an electrical signal, wherein the electrical signal comprises at least one physiological signal characteristic in a physiological tissue, and is sent to the analog-to-digital conversion unit;

converting, by the analog-to-digital conversion unit, the electrical signal into a digital signal;

optimizing, by the signal-to-noise ratio optimization module, a signal-to-noise ratio of the digital signal by establishing at least one of a plurality of logic strategies based on at least two of four elements comprising a carrier signal, a modulated signal, a demodulated signal and a filter, outputting an adjustment coefficient to the driving adjustment unit, and outputting an optimized digital signal to the algorithm processing unit, and the filter is at least one type of a low-pass filter, a high-pass filter, a band-pass filter, a band-stop filter and an adaptive filter;

adjusting, by the driving adjustment unit, an magnitude of a driving current of the light-emitting unit base on the adjustment coefficient generated by the signal-to-noise ratio optimization module through the digital signal processed by the at least one logic strategy, and controlling the light-emitting unit to alternately emit light to form the modulated signal obtained by the photoelectric conversion unit, wherein the oximetry system is based on an alternate light-emitting strategy of red light and infrared light; and performing, by the algorithm processing unit, a physiological parameter conversion and calculation based on the digital signal processed by the at least one logic strategy of the signal-to-noise ratio optimization module to obtain at least one physiological parameter, and demodulating the digital signal to obtain an effective physiological signal;

wherein the plurality of logic strategies comprise:

a first logic strategy to eliminate a high-frequency noise: a frequency of the carrier signal being at least four times a cut-off frequency of the low-pass filter, and the cut-off frequency of the low-pass filter being at least four times a frequency of the modulated signal, and the low-pass filter configured to filter the carrier signal to eliminate a high-frequency interference of the modulated signal;

a second logic strategy to improve a sampling accuracy: establishing an adaptive width adjustment mechanism based on the modulated signal and the demodulated signal, wherein in the adaptive width adjustment mechanism, a pulse width of the modulated signal adaptively increases or decreases, and the demodulated signal adaptively compensates accuracy according to a change of the pulse width;

a third logic strategy to eliminate low-frequency interference: establishing an adaptive filtering mechanism based on the demodulated signal and the adaptive filter, wherein in the adaptive filtering mechanism, a window length of the adaptive filter is dynamically adjusted.

According to a second aspect of embodiments of the present disclosure, there is provided an oximetry system, comprising:

a light-emitting unit, configured to emits at least one light signal to penetrate a human tissue;

a photoelectric conversion unit, configured to receive the at least one light signal emitted by the light-emitting unit after penetrating the human tissue and convert the at least one light signal into an electrical signal and send the electrical signal to an analog-to-digital conversion unit, wherein the electrical signal comprises at least one physiological signal characteristic in the physiological tissue;

the analog-to-digital conversion unit, connected to the photoelectric conversion unit, configured to perform an analog-to-digital conversion on the electrical signal to generate a digital signal, wherein the analog-to-digital conversion unit is provided with a signal-to-noise ratio optimization module;

the signal-to-noise ratio optimization module configured to optimize the signal-to-noise ratio of the digital signal by establishing at least one of a plurality of logic strategies based on at least two of four elements comprising a carrier signal, a modulated signal, a demodulated signal and a filter, and output an adjustment coefficient required by a driving adjustment unit, and wherein the optimized digital signal is transmitted to the algorithm processing unit, and the adjustment coefficient is transmitted to the driving adjustment unit, wherein and the filter is at least one type of a low-pass filter, a high-pass filter, a band-pass filter, a band-stop filter and an adaptive filter;

the driving adjustment unit, connected to the light-emitting unit and the analog-to-digital conversion unit, configured to adjust the magnitude of the driving current of the light-emitting unit based on the adjustment coefficient generated by the signal-to-noise ratio optimization module through the processed digital signal;

an algorithm processing unit, connected to the analog-to-digital conversion unit, configured to perform a conversion and calculation on physiological parameters based on the digital signal processed by the signal-to-noise ratio optimization module;

a communication unit, connected to the algorithm processing unit and a display unit, configured to send the physiological parameter information calculated by the algorithm processing unit to the display unit; and the display unit, configured to display the received physiological parameter information after an in-depth processing;

wherein the plurality of logic strategies comprise:

a first logic strategy to eliminate a high-frequency noise: a frequency of the carrier signal being at least four times a cut-off frequency of the low-pass filter, and the cut-off frequency of the low-pass filter being at least four times a frequency of the modulated signal, and the low-pass filter configured to filter the carrier signal to eliminate a high-frequency interference of the modulated signal;

a second logic strategy to improve a sampling accuracy: establishing an adaptive width adjustment mechanism based on the modulated signal and the demodulated signal, wherein in the adaptive width adjustment mechanism, a pulse width of the modulated signal adaptively increases or decreases, and the demodulated signal adaptively compensates accuracy according to a change of the pulse width;

a third logic strategy to eliminate low-frequency interference: establishing an adaptive filtering mechanism based on the demodulated signal and the adaptive filter, wherein in the adaptive filtering mechanism, a window length of the adaptive filter is dynamically adjusted.

BRIEF DESCRIPTION OF THE DRAWINGS

In order to explain the embodiments of the present disclosure or the technical solutions in the prior art more clearly, the drawings that need to be used in the description of the embodiments or the prior art will be briefly introduced as follows. Obviously, the drawings in the following description are only some embodiments of the present disclosure. For those of ordinary skill in the art, other drawings can be obtained without creative work based on the structure shown in these drawings.

DESCRIPTION OF REFERENCE SIGNS

100, measurement system; 10, light-emitting unit; 20, photoelectric conversion unit; 30, analog-to-digital conversion unit; 31, signal-to-noise ratio optimization module; 40, driving adjustment unit; 50, algorithm processing unit; 60, communication unit; and 70, display unit.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

Figure 1:
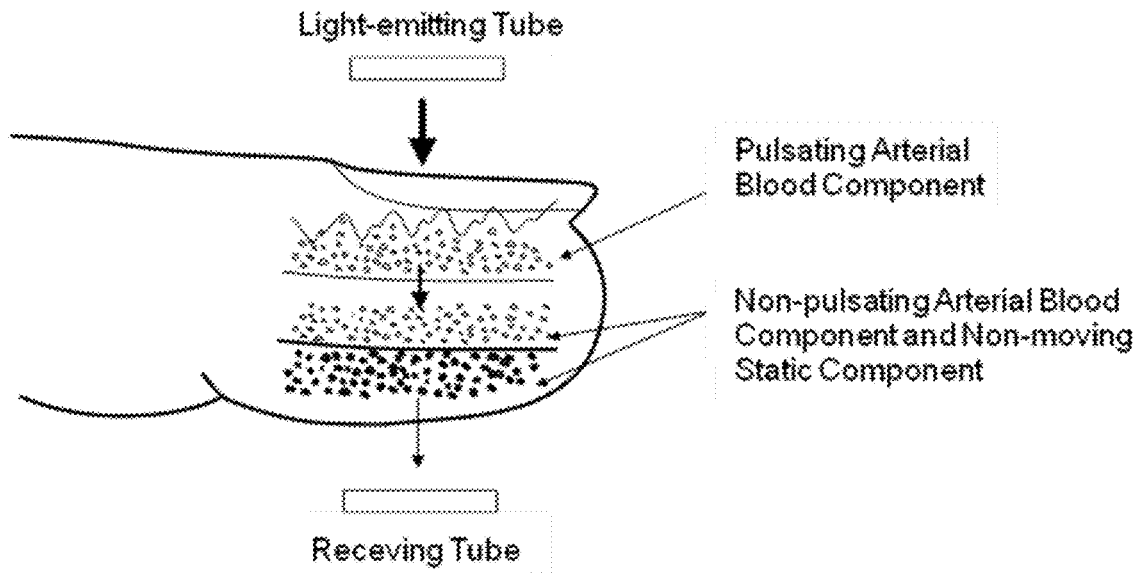
FIG. 1 is a schematic diagram showing a photoelectric signal acquisition of an oximetry system in the background art.
Figure 2:
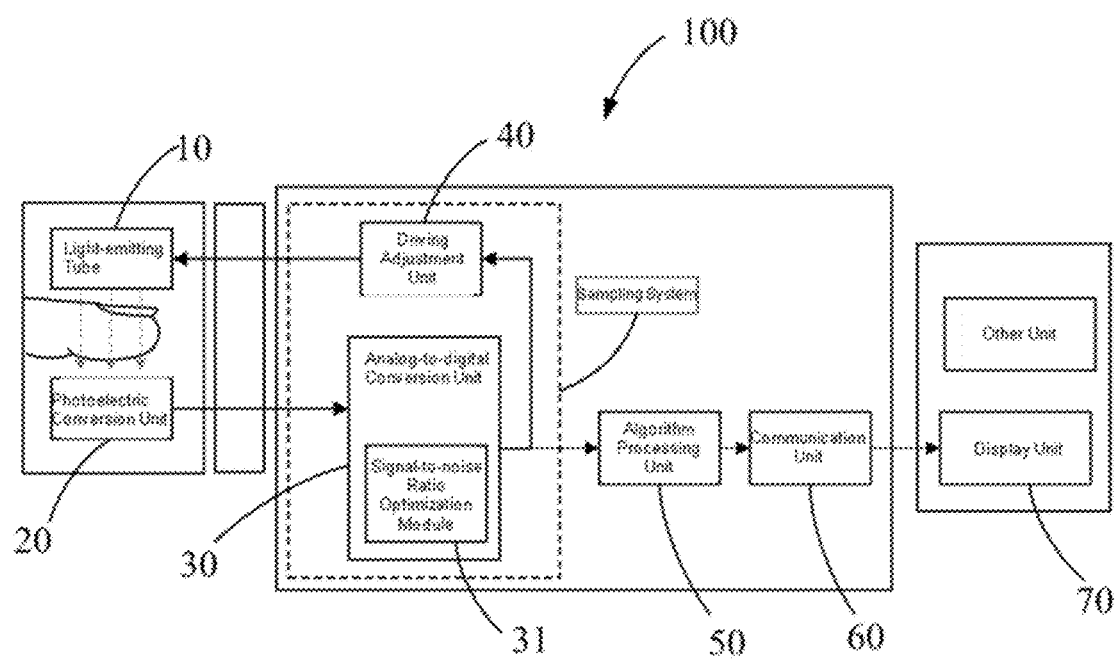
FIG. 2 is a schematic diagram of a composition of an oximetry system according to a first embodiment of the present disclosure.

Referring to FIG. 2, provided is an oximetry system 100 applied in a method for improving a measurement accuracy of the measurement system according to the present disclosure, including a light-emitting unit 10, a photoelectric conversion unit 20, an analog-to-digital conversion unit 30, a driving adjustment unit 40, an algorithm processing unit 50, a communication unit 60 and a display unit 70. The analog-to-digital conversion unit 30 is connected to the photoelectric conversion unit 20, the driving adjustment unit 40 and the algorithm processing unit 50. The driving adjustment unit 40 is connected to the light-emitting unit 10. The communication unit 60 is connected to the algorithm processing unit 50 and the display unit 70. The analog-to-digital conversion unit 30 is further provided with a signal-to-noise ratio optimization module 31.

The light-emitting unit 10 emits at least one light signal, such as a red light signal or an infrared light signal, to penetrate a human tissue. The photoelectric conversion unit 20 receives the light signal emitted by the light-emitting unit 10 after penetrating the human tissue, converts it into an electrical signal and sends it to the analog-to-digital conversion unit 30. The electrical signal includes at least one physiological signal characteristic in the physiological tissue, such as an oxygen saturation parameter, a Pulse Rate (PR), a Perfusion Index (PI), a Respiration Rate (RR) and a Perfusion Variation Index (PVI). The analog-to-digital conversion unit 30 performs an analog-to-digital conversion on the electrical signal to generate a digital signal.

The signal-to-noise ratio optimization module 31 optimizes a signal-to-noise ratio of the digital signal and outputs an adjustment coefficient required by the driving adjustment unit 40. The optimized digital signal is transmitted to the algorithm processing unit 50, and the adjustment coefficient is transmitted to the driving adjustment unit 40.

The algorithm processing unit 50 performs a conversion and a calculation of physiological parameters based on the digital signal processed by the signal-to-noise ratio optimization module 31. The driving adjustment unit 40 adjusts a magnitude of the driving current of the light-emitting unit 10 based on the adjustment coefficient generated by the signal-to-noise ratio optimization module 31 through the processed digital signal. The communication unit 60 is configured to transmit the physiological parameter information calculated by the algorithm processing unit 50 to the display unit 70. The display unit 70 displays the received physiological parameter information after an in-depth processing.

Figure 3:
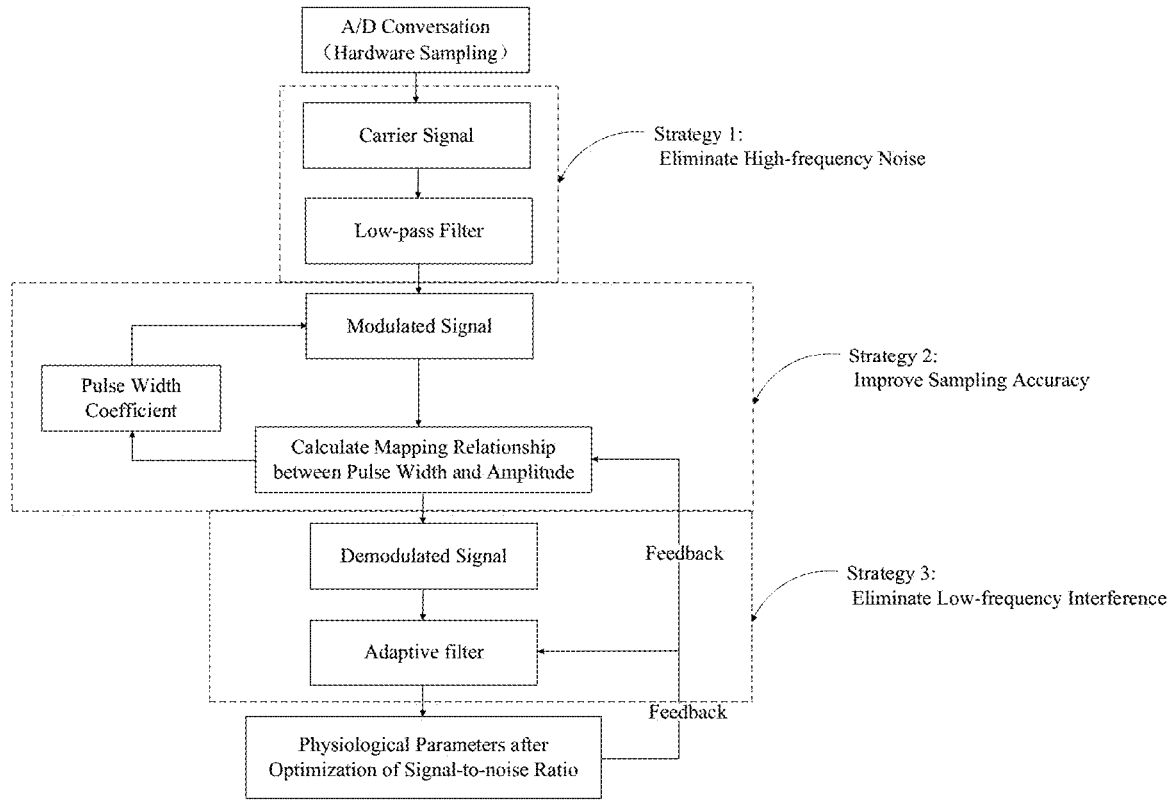
FIG. 3 is a schematic diagram showing logic strategies of a signal-to-noise ratio optimization module in a method for improving a measurement accuracy of a measurement system according to the present disclosure.

As shown in FIG. 3, the present disclosure proposes a method for improving the measurement accuracy of the measurement system, which is applied to the above-mentioned oximetry system 100. The method optimizes the signal-to-noise ratio of the digital signal through at least one logic strategy of eliminating a high-frequency noise, improving a sampling accuracy, and eliminating a low-frequency interference, thereby improving the measurement accuracy of the system, and the method specifically includes the following steps.

The signal-to-noise ratio optimization module 31 establishes at least one logic strategy for optimizing the signal-to-noise ratio of the digital signal for four elements including a carrier signal, a modulated signal, a demodulated signal and a filter. The logic strategy includes at least two of the four elements including the carrier signal, the modulated signal, the demodulated signal, and the filter, and the filter is at least one type of a low-pass filter, a high-pass filter, a band-pass filter, a band-stop filter, and an adaptive filter.

One of the logic strategies is to eliminate high-frequency noise: the carrier signal, the low-pass filter, and the modulated signal sequentially meet the principle of at least 4 times ratio, that is, a frequency of the carrier signal is at least 4 times a cut-off frequency of the low-pass filter, and the cut-off frequency of the low-pass filter is at least 4 times a frequency of the modulated signal. The low-pass filter is configured to filter the carrier signal and eliminate a high-frequency interference part of the modulated signal.

One of the logic strategies is to improve the sampling accuracy: an adaptive width adjustment mechanism based on the modulated signal and the demodulated signal is established. The adaptive width adjustment mechanism refers to: the pulse width of the modulated signal can adaptively increase or decrease, and the demodulated signal adaptively compensates the accuracy according to the change of pulse width change, thereby improving the signal-to-noise ratio.

One of the logic strategies is to eliminate the low-frequency interference: an adaptive filtering mechanism is established based on the demodulated signal and the adaptive filter, so that a window length of the adaptive filter is dynamically adjusted, filtering dynamic low-frequency interferences.

The driving adjustment unit 40 adjust the magnitude of the driving current of the light-emitting unit 10 based on the adjustment coefficient generated by the signal-to-noise ratio optimization module 31 through the digital signal processed by the at least one logic strategy of the signal-to-noise ratio optimization module 31. The algorithm processing unit 50 performs the conversion and the calculation of physiological parameters based on the digital signal processed by the at least one logic strategy of the signal-to-noise ratio optimization module 31 to obtain at least one physiological parameter.

Optionally, the signal-to-noise ratio optimization module 31 of the present disclosure further includes the following logic strategy: an adaptive amplitude adjustment mechanism based on the modulated signal and the demodulated signal is established. The adaptive amplitude adjustment mechanism refers to: an amplitude of the modulated signal can be adaptively increase or decrease, and the demodulated signal adaptively compensate the accuracy according to the change of the amplitude, thereby improving the signal-to-noise ratio. That is, the sampling accuracy is improved through the adaptive amplitude adjustment mechanism. Each logic strategy is described as follows.

1. Logic Strategy: Eliminate High Frequency Noise

The analog-to-digital conversion unit 30 converts the electrical signal output by the photoelectric conversion unit 20 into a digital signal for use by other units. This unit is the most important unit in the measurement system 100. Once the conversion mode is fixed, it means that the reference noise level of the entire system is fixed and can no longer be adjusted. In traditional methods, a RC capacitor filter is generally added to the hardware, or a simple high-pass/low-pass filtering is performed for the demodulated physiological signal. Due to hardware limitations, the RC filter implemented on the circuit generally has a relatively low filtering order, that is, the filtering effect is limited. Moreover, the demodulated signal does not filter out noise, and the noise is further aliased to the low-frequency signal due to frequency reduction in the demodulation process, causing the back-end processing effect to be minimal. In addition to the physiological signal for calculating the physiological parameter, the current signal converted by the photoelectric conversion unit 20 further includes various other messy noises, such as the existing electromagnetic noise of the oximetry system 100. In addition, due to a basic principle of the oximetry system 100, the external ambient light also generates a lot of messy noise. Common light source interferences of the oximetry system 100 include: daylight, incandescent lamps, blue lights, surgical lights, and even the own light source pollution caused by improper wearing. When the physiological signal is relatively strong, that is, the signal-to-noise ratio (SNR) is high, an output result of the oximetry system 100 is relatively accurate, since the noise is very weak and can be ignored. When the physiological signal is weak, that is, the signal-to-noise ratio (SNR) is low, it is difficult to ensure an accuracy of the output result of the oximetry system 100.

Figure 4:
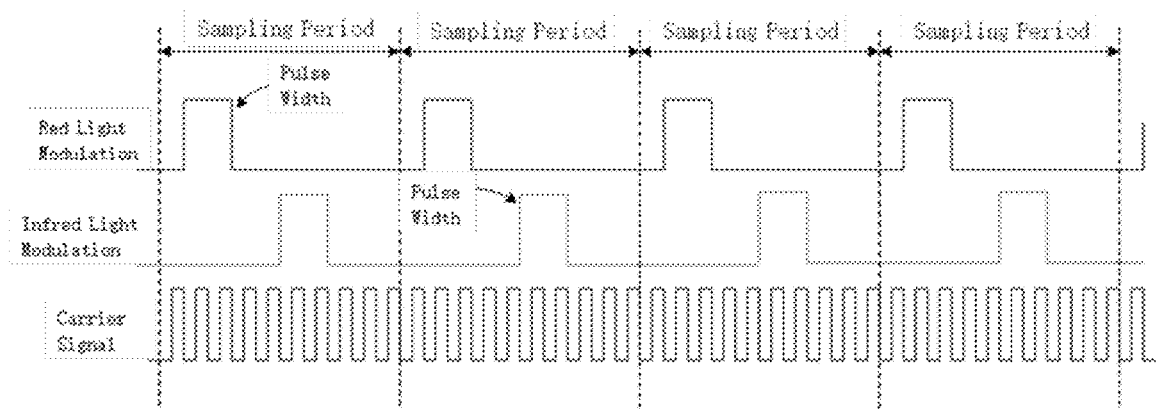
FIG. 4 is a schematic diagram showing a sampled signal and a carrier signal in the oximetry system according to the present disclosure.

The signal noise of the light source and the electromagnetic noise of the oximetry system 100 itself can be approximately understood as a random white noise distribution, and thus the filtering is feasible. As shown in FIG. 4, the oximetry 100 adopts a strategy of red light and infrared light alternately emitting. By controlling the light-emitting unit 10 to emit light alternately, the modulated signal obtained by the photoelectric conversion unit 20 is formed. A modulation frequency of the infrared light is the same as a modulation frequency of the red light, and a fixed sampling period is confirmed based on the two forms. The pulse waveform in the figure is an effective physiological signal, and the effective physiological signal be obtained only by demodulating the signal (obtaining a sampling value on the pulse wave).

If the sampled signal is to be filtered to achieve the purpose of filtering out random white noise, it should comprehensively take the frequency of the carrier signal, the frequency of the modulated signal and the filter characteristics into consideration.

The frequency of the carrier signal determines the number of effective samples that can be collected from the infrared light/red light modulated signal. Theoretically, the higher the frequency of the carrier signal, the better. However, due to the characteristics of the Microcontroller Unit (MCU) chip, the frequency of the carrier signal cannot be increased indefinitely. At present, the built-in Analog to Digital Converter (ADC), on the common STMicroelectronics (ST) chip and NXP chip, can generally support a sampling frequency of about 12 MHz, which has been able to meet the technical solutions disclosed in this description, and the chips with higher frequency bring about a substantial increase in costs. Unless there are special needs, the traditional monitoring parameters (such as electrocardiogram (ECG), blood oxygen (SpO2), blood pressure (NIBP) and body temperature (TEMP)) can already meet the application requirements and meet the low-cost requirements.

There is a very strong correlation between the frequency of the modulated signal and the filter characteristics. According to the theoretical knowledge of digital signals, an essence of the signal is a superposition of sine waves with different periods, phases and amplitudes, as a square wave shown in FIG. 4. According to the Nyquist sampling law, if the sampled signal is to be restored without distortion, a sampling rate must be at least 2 times a frequency of the analog signal.

Based on this principle, the method for improving the measurement accuracy of the measurement system according to the present disclosure adopts a logic strategy to eliminate high-frequency noise, and the logic strategy is specifically as follows. The carrier signal, the low-pass filter, and the modulated signal sequentially meet the principle of at least 4 times ratio, that is, the frequency of the carrier signal is at least 4 times the cut-off frequency of the low-pass filter, and the cut-off frequency of the low-pass filter is at least 4 times the frequency of the modulated signal. The low-pass filter is configured to filter the carrier signal and eliminate the high-frequency interference part of the modulated signal.

In this logic strategy, the frequency of the carrier signal, the frequency of the modulated signal, and the cut-off frequency of the low-pass filter are abstracted as a relationship between a frequency of the analog signal and the sampling rate.

The frequency of the carrier signal is greater than or equal to 4 times the cut-off frequency of the low-pass filter, and the cut-off frequency of the low-pass filter is greater than or equal to 4 times the frequency of the modulated signal. Therefore, it can not only realize the filtering of the carrier signal, but also satisfies the Nyquist sampling law, so that the high-frequency noise interference is effectively removed without distorting the physiological signal, thereby greatly improving the measurement accuracy of the oximetry system 100.

Taking the oxygen saturation parameter as an example, the effective frequency range of the physiological signal is [0.2-5] Hz. The frequency of the sampled signal selected by the embodiment of the present disclosure is 125 Hz (for satisfying the principle that the frequency of sampled signal is 4 times the frequency of the physiological signal), so the filtering cut-off frequency of the sampled signal is at least 500 Hz. According to the above derivation formula, the frequency of the carrier signal need to be at least 2 kHz in order to meet the basic requirements of filtering of the carrier signal.

According to the above-mentioned logic strategy for eliminating high frequency noise, the interference of ambient light (blue light, surgical lamp, incandescent lamp, fluorescent lamp) and the electromagnetic noise of the hardware itself can be effectively filtered out, thereby improving the signal-to-noise ratio, and further improving the measurement accuracy of the oximetry system 100.

2. Logic Strategy: Improve Sampling Accuracy

The driving adjustment unit 40 is mainly configured to adjust the driving current of the light-emitting unit 10, so that the signal converted by the photoelectric conversion unit 20 from the light-emitting unit 10 is always within a relatively reasonable range. During to a poor peripheral blood circulation owing to physiological abnormalities such as hypothermia, shock, patients are more likely to have extremely low weak perfusion. In this circumstance, the traditional oximetry system usually increases the signal-to-noise ratio by increasing the magnitude of the driving current. However, when the patient's measurement portion is thick, the driving current has reached the maximum value, so the method of increasing the driving current has no effect. In this circumstance, the traditional oximetry system either outputs inaccurate parameter values or fails to measure. Part of the oximetry system adopts a method of increasing the luminous pulse width, and increases the signal-to-noise ratio through a multi-point averaging method. However, in the tradition, it is necessary to perform statistics on the fluctuation characteristics of the sampling values for a long time (at least 30 s) to judge how to adjust the pulse width, and it needs to be maintained for a period of time after each pulse width adjustment, which cannot be switched quickly and freely. Due to a hysteresis of the light-emitting pulse width switching, there may be misjudgments due to inaccurate blood oxygen measurement at a critical moment, and may also cause a excessive power consumption at certain moments (for example, physiological signals have returned to normal perfusion, but the light-emitting pulse width has not been switched back in time).

In view of the above-mentioned problems, the logic strategy adopted to improve the measurement accuracy of the measurement system according to the present disclosure is to establish an adaptive width adjustment mechanism for the modulated signal and the demodulated signal. In the adaptive width adjustment mechanism, the pulse width of the modulated signal can adaptively increase or decrease, and the demodulated signal adaptively compensate the accuracy according to the pulse width change, to achieve an improvement of the signal-to-noise ratio.

Figure 5:
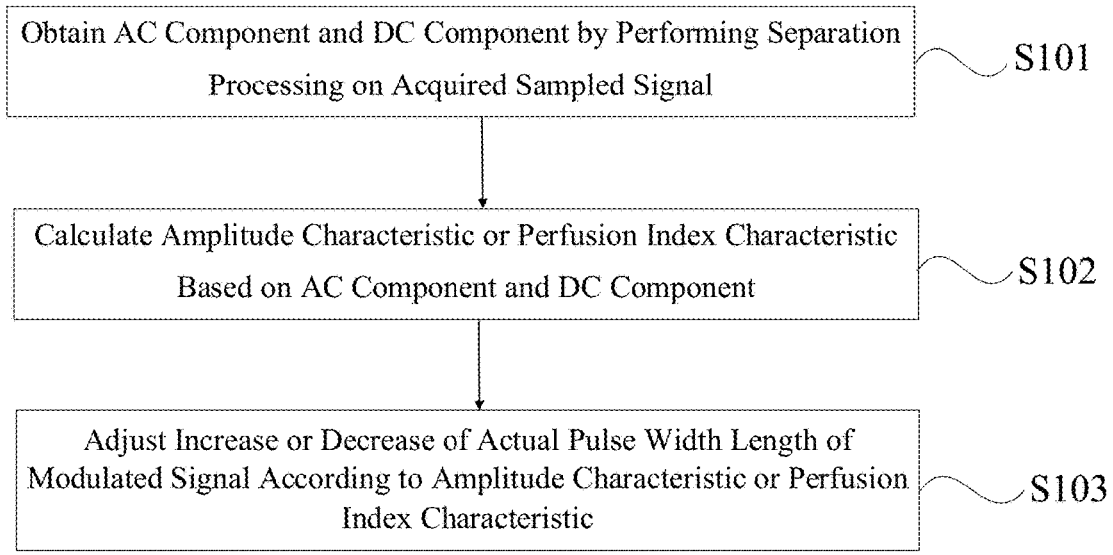
FIG. 5 is a schematic flow chart of an adaptive width adjustment in the logic strategy for improving a sampling accuracy according to the present disclosure.

Specifically, referring to FIG. 5, the adaptive width adjustment in the logic strategy for improving the sampling accuracy according to the present disclosure includes the following steps.

S101, an AC component and a DC component are obtained by performing a separation processing on the acquired sampled signal.

S102, the amplitude characteristic or the perfusion index characteristic is obtained by calculation based on the AC component and the DC component.

The characteristics of the AC component and the DC component mainly include AC volume (pulse pulsating blood volume), the DC volume (non-blood pulsating volume, such as absorption volume of bones, skin and veins), a mean value and a standard deviation of amplitude changes over a period of time, and a rhythm (pulse rate) of the pulse wave. From these information, the perfusion index (PI) can be calculated, PI=AC/DC*coef, and coef is a calibration coefficient, which is a constant.

S103, the increase or the decrease of the actual pulse width length of the modulated signal is adjusted according to the amplitude characteristic or the perfusion index characteristic.

That is, the actual pulse width length of the modulated signal is adjusted according to the amplitude characteristic or the perfusion index characteristic, so as to increase or decrease according to the practice situation, thereby compensating or correcting the perfusion degree in an adaptive manner.

Figure 6:
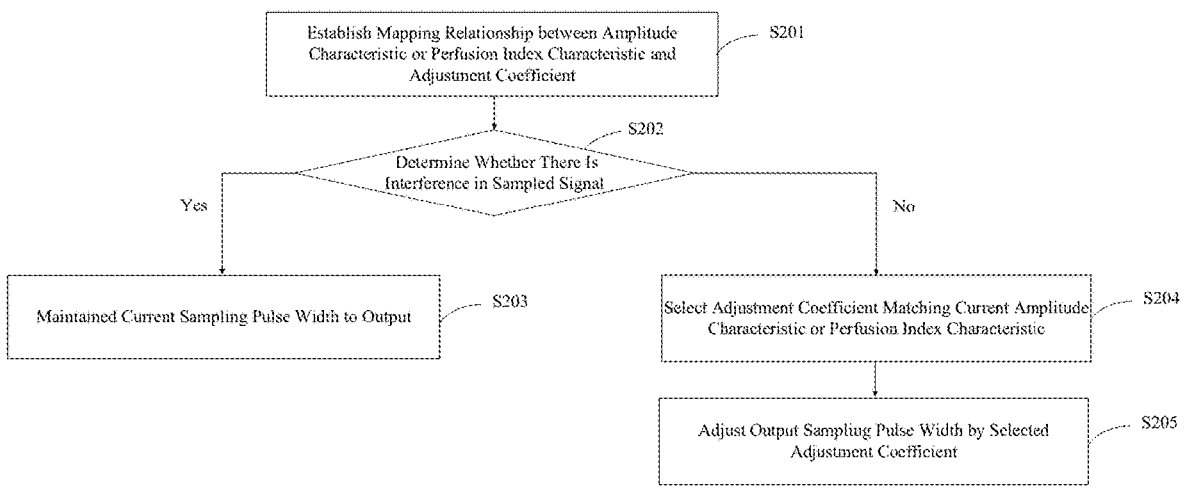
FIG. 6 is a schematic flow chart for adjusting an increase or a decrease of an actual pulse width length of a modulated signal according to the present disclosure.

Further, as shown in FIG. 6, in step S103, the adjusting the increase or decrease of the actual pulse width length of the modulated signal includes the following steps.

S201, a mapping relationship between the amplitude characteristic or the perfusion index characteristic and the adjustment coefficient is established.

In the embodiment of the present disclosure, the AC component characteristic and the DC component characteristic may be performed statistics firstly. For example, the characteristics are expressed by mean value, standard deviation, normal distribution characteristics, and then the corresponding amplitude characteristics or the perfusion index characteristics is performed statistics. Then a one-to-one mapping relationship between the amplitude characteristic or the perfusion index characteristic and the adjustment coefficient is established.

While performing statistics on the AC component characteristics and the DC component characteristics, the AC component characteristics and the DC component characteristics of the pulse sampled signal in at least one complete cycle are selected to evaluate the AC characteristics and the DC characteristics of the pulse sampled signal.

In the embodiment of the present disclosure, at least three pulse wave periods are generally selected to determine whether the periods of these three pulse waves are uniform. If the fluctuation of the standard deviation (std) is equal or less than 5 bpm, the period is uniform. Or whether the amplitudes of the three pulse waves are uniform is determined, for example, if the amplitude deviation of the standard deviation (std) is equal or lesser than 5%, the amplitude is uniform. The infrared light signal or the red light signal may be selected for determination, or both the two are combined to determine.

S202, whether there is an interference in the sampled signal is determined.

S203, the current sampling pulse width is maintained to output, if there is interference.

S204, an adjustment coefficient matching the current amplitude characteristic or the perfusion index characteristic is selected, if there is no interference.

S205, the sampling pulse width of the output is adjusted by the selected adjustment coefficient.

Therefore, the pulse width of the sampled signal may be adaptively adjusted under different sampling environments, such as different temperature change in the patient's body, different filling degree of the patient's blood vessel.

This logic strategy can not only adaptively and quickly respond to a switching of the light-emitting pulse width, but also increase a logic resolution of the sampled signal, to achieve a low-resolution and high-precision output effect. Moreover, it can effectively improve the signal-to-noise ratio of the physiological signal, and improve the measurement accuracy.

The specific steps of determining whether there is an interference in the sampled signal according to the embodiment of the present disclosure are as follows.

A consistency of amplitudes of the at least three pulse wave is determined. A consistency of periods of the at least three pulse wave is determined. Whether a amplitude standard deviation of the pulse wave exceeds a preset ratio of the amplitude mean value is determined. In this embodiment, the preset ratio is 25%. Whether the period standard deviation of the pulse wave exceeds a preset ratio of the period mean value is determined. In this embodiment, the preset ratio is 25%. When any of the above four conditions are not met, it is considered that there is an interference.

The adjustment coefficient may be determined as follows.

The maximum width M1 of a light-emitting pulse is obtained. An actual width M2 of the light-emitting pulse is obtained. A gain coefficient P matched with the light-emitting pulse is calculated as P=M1/M2. If the maximum width of the light-emitting pulse is M1=12, and the actual width of the light-emitting pulse is M2=9, then the gain coefficient matched with the light-emitting pulse is P=M1/M2=12/9.

The adaptive width adjustment in this logic strategy is a closed-loop feedback adjustment system. Firstly, the sampled signal is obtained in real time (at least one of the red light signal and the infrared light signal is adopted for closed-loop judgment, and the effect is better if the two signal are adopted), and an AC and DC separation is performed on the sampled signal, to perform statistics on the AC component (AC) characteristics and the DC component (DC) characteristics. The AC component refers to the changing component of the light absorption amount, such as an arterial pulsating blood component (the blood flow changes constantly, causing the absorption amount to change accordingly). The DC component refers to the constant component of the light absorption amount, such as skin, bone, fat and venous blood. From a physiological point of view, the magnitude of the DC component is much greater than the magnitude of the AC component. Therefore, an amount of change in the AC component is the key to realizing the driving adjustment of the adaptive pulse width. The AC component characteristics and the DC component characteristics may be expressed by the mean value, the standard deviation, and the normal distribution characteristics. Further, the perfusion index (PI) can be calculated (PI=AC/DC*coef, coef is a calibration coefficient, which is a constant). Then, at least one complete period of the pulse wave is selected to evaluate its AC and DC characteristics, so as to select an appropriate adjustment coefficient. Generally speaking, selecting a few more pulse periods for comprehensive judgment is helpful to improve a recognition of noise interference and avoid decision errors caused by noise. The perfusion index (PI) is taken as an example to describe the solution in this embodiment. it is assumed that the perfusion indexes (PI) [0.9%, 0.8%, 0.7%, 0.6%, 0.5%, 0.4%, 0.3%, 0.2%, 0.1%] corresponds to the adjusted adjustment coefficients [12/4, 12/5, 12/6, 12/7, 12/8, 12/9, 12/10, 12/11, 12/12], respectively. If there is a noise interference in at least one pulse wave period, the current adjustment gain is maintained without adjustment. If there is no noise interference, the corresponding adjustment coefficient is selected according to an interval of the calculated perfusion index. For example, when the current perfusion index (PI) is 0.25%, which falls into the range of [0.3%-0.2%], then an adjustment coefficient gear of 12/11 is selected correspondingly. After selecting the adjustment coefficient, the driving adjustment unit can be set to complete the optimized output of the sampled signal.

Figure 7:
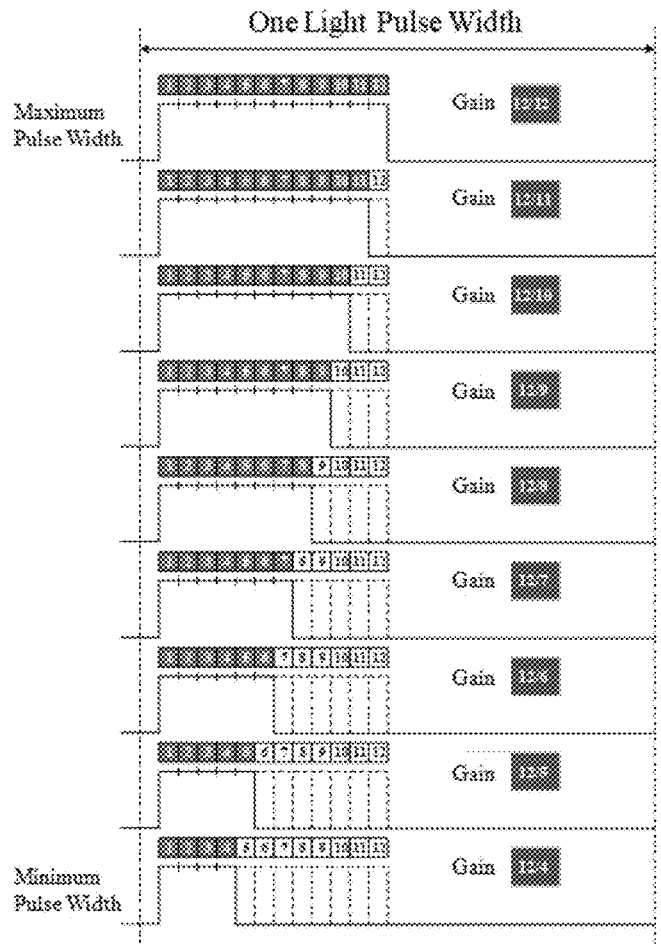
FIG. 7 is a schematic diagram showing that the method for improving the measurement accuracy of the measurement system adaptively compensates an accuracy according to a pulse width change according to the present disclosure.

The adaptive compensation accuracy based on the pulse width change in this logic strategy is as showed in FIG. 7.

The driving pulse width adjustment system is constructed in a reverse direction based on the maximum driving pulse width. It is assumed that the minimum driving pulse width has 4 sampling points, and the maximum driving pulse width has 12 sampling points. When the driving pulse width only has 8 sampling points, the cumulative sum of these 8 sampling points is multiplied by an adjustment gain 12/8 to expand to 12 sampling points, that is, an effective accuracy of the sampling value is always maintained at 19 bits (It is assumed that the effective accuracy of the sampling value obtained under 4 sampling points of the minimum drive pulse width is 16 bits, 8 sampling values are added under the maximum pulse width to obtain a total of 12 sampling values. 8 sampling values are 2 to the power of 3, and the valid precision is 16 bits+3 bits, which is 19 bits. The engineering accuracy is expressed in terms of 2 to the power of N). In order to keep the effective number of data from changing with the driving pulse width, the accuracy is automatically supplemented when the sampling value of the driving pulse width obtained is insufficient. The biggest advantage of this design is that it maintains a stability of the sampled values without causing the sampled value to fluctuate due to the change of the driving pulse width. Therefore, it breaks a constraint that the driving pulse width can only be switched after waiting for a long enough time in the traditional technology, achieving a purpose of adaptive adjustment anytime and anywhere according to the fluctuation characteristics of the current sampled signal.

In the adaptive pulse width adjustment of this logic strategy, it is the cumulative sum, instead of the average value, is taken as the final output, which is conductive to improve the logic accuracy, and further improve the signal-to-noise ratio in the weak perfusion state, thereby effectively solving the problem of insufficient blood pulsating component information in the weak perfusion state. It is assumed that an ADC physical sampling accuracy of the chip is 16 bits and a weak perfusion level is 0.025%, then the maximum amplitude of the blood pulsation component is approximately 16 points (2^16*0.025%). Considering that the sampling value needs to fall within a reasonable range, and too high/too low sampling value can easily lead to signal distortion, so the signal amplitude needs to be halved, that is, there are only 8 sampling points to express blood pulsation changes. From the knowledge of digital signal processing, it is known that 8 sampling points depicting the pulsation changes of the pulse wave inevitably lead to the loss of physiological signal information, which leads to an inaccurate parameter measurement. By adjusting the sampling pulse width in an adaptive manner of the present disclosure, 8 sampling points can be increased to 64 points (8*(2^3)) to express the pulse wave pulsation change, and the accuracy of parameter measurement will inevitably be greatly improved.

The essence of the logic strategy for improving the sampling accuracy is to adjust the number of sampling points. Each sampling point corresponds to a time unit, which is actually pulse width information. The increase or decrease of the number of sampling points corresponds to the increase or decrease of the pulse width of the modulated signal. When the signal-to-noise ratio is high, the accuracy is strong enough and does not require too many sampling values, so the sampling pulse width is reduced correspondingly. On the contrary, when the signal-to-noise ratio is poor, enough sampling values are increased, so the sampling pulse width increases correspondingly. It is assumed that one sample value needs a time of 50 us, then 4 sample values correspond to a pulse width of 200 us. The adjustment of the sampling pulse width length, or the average number of sampling values, depends on a feedback of a final output result of the signal-to-noise ratio optimization module. Based on the output result, the amplitude characteristic or the perfusion index characteristic is calculated to adjust the length of the actual pulse width. The purpose of the logic accuracy complement is to output the maximum accumulated points, which can ensure that the accuracy is not lost due to the average under weak perfusion.

The adaptive width adjustment mechanism of this logic strategy not only breaks through the constraints of traditional technology, but also realizes the adaptive adjustment of the driving pulse width. More importantly, it improves the accuracy of the sampled signal, improves the signal-to-noise ratio in the weak perfusion state, and increase the accuracy of measurement parameters. This technical solution has the following advantages. 1, It can adaptively adjust the driving pulse width according to changes in the physiological perfusion level, so as to achieve performance improvement under weak perfusion and low-power operation under normal perfusion. Under the premise of ensuring performance, the demand for low power consumption is realized and the service life of optoelectronic components is improved. 2, the accuracy of the sampled signal is expanded, having high-performance output solutions even in the use of low-precision, low-cost hardware design. The solution turns into a practical and feasible solution from a theoretical model, which also brings a huge competitive advantage for promotion in the industry.

Figure 8:
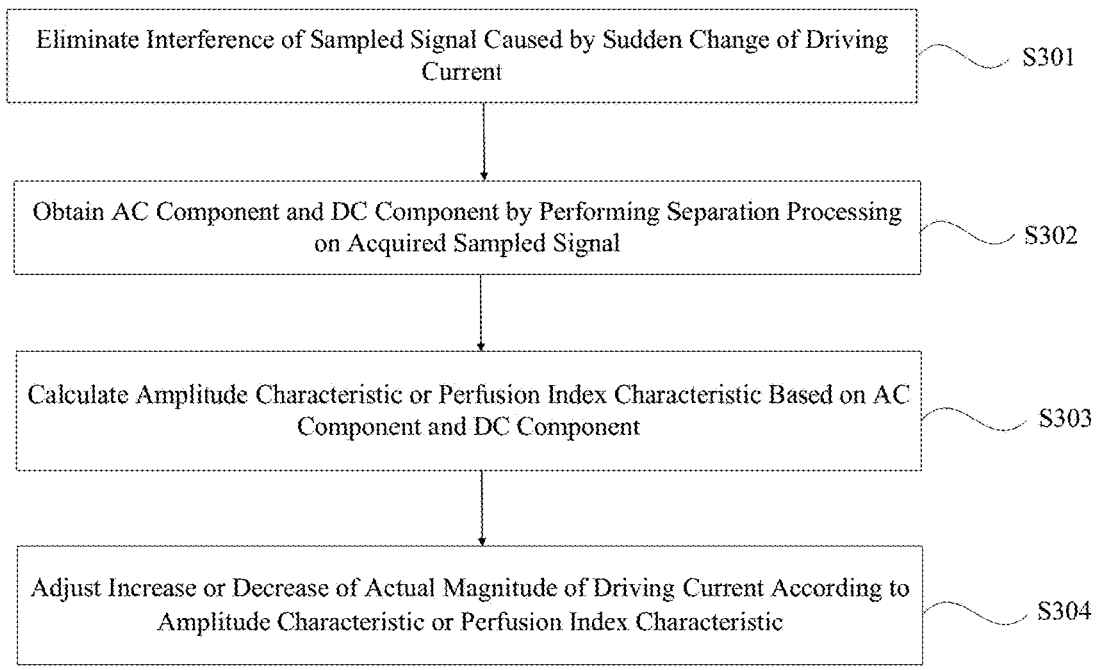
FIG. 8 is a schematic flow chart of an adaptive adjustment of a driving current in the logic strategy for improving the sampling accuracy according to the present disclosure.

Furthermore, the above-mentioned logic strategy for improving the sampling accuracy further includes an adaptive adjustment for the magnitude of the driving current. As shown in FIG. 8, it includes the following steps.

S301, the interference of the sampled signal caused by the sudden change of the driving current is eliminated.

S302, an AC component and a DC component is obtained by performing a separation processing on the acquired sampled signal.

S303, the amplitude characteristic or the perfusion index characteristic is calculated based on the AC component and the DC component.

S304, the increase or decrease of the actual magnitude of the driving current is adjusted according to the amplitude characteristic or the perfusion index characteristic.

That is, the actual magnitude of the driving current is adjusted according to the amplitude characteristic or the perfusion index characteristic. The actual magnitude of the driving current is automatically increased or decreased according to the practice situation. The insufficient driving current is compensated in an adaptive manner or the excessive driving current is reduced.

Figure 9:
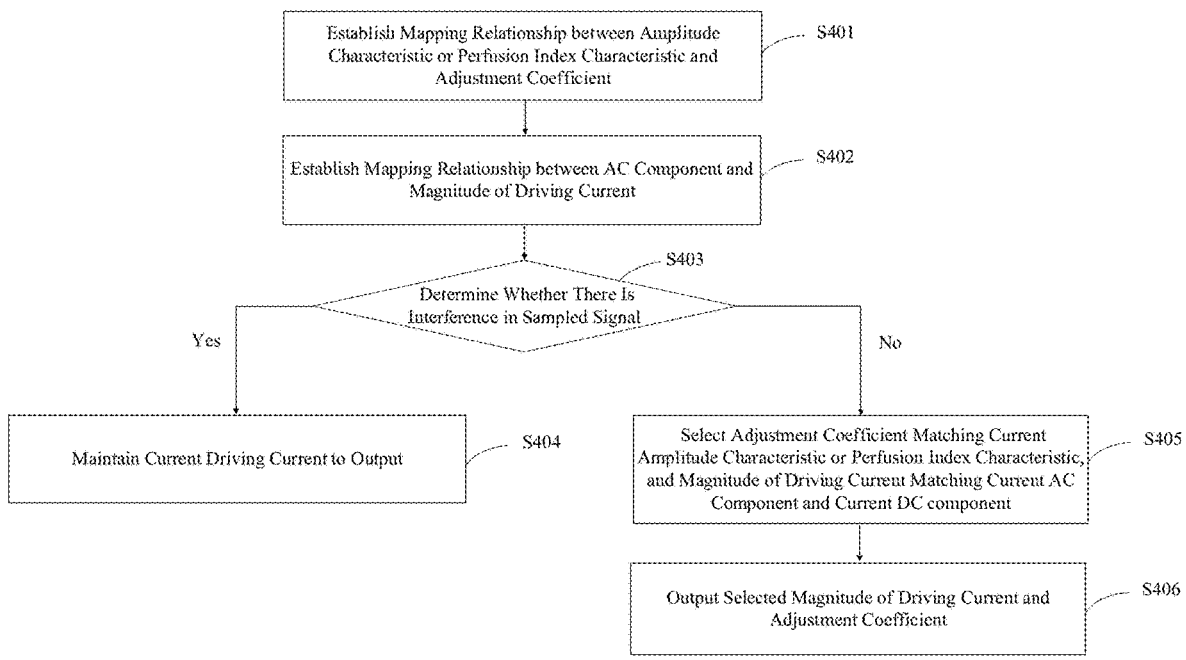
FIG. 9 is a schematic flow chart for adjusting the increase or the decrease of an actual magnitude of the driving current according to the present disclosure.

Further, as shown in FIG. 9, the adjustment of the increase or decrease of the actual magnitude of the driving current includes the following steps.

S401, a mapping relationship between the amplitude characteristic or the perfusion index characteristic and the adjustment coefficient is established.

S402, a mapping relationship between the AC component and the magnitude of the driving current is established.

S403, whether there is interference in the sampled signal is determined.

S404, the current driving current is maintained to output, if there is interference.

S405, an adjustment coefficient matching the current amplitude characteristic or the perfusion index characteristic is selected, and a magnitude of the driving current matching the current AC component and the current DC component is selected, if there is no interference.

S406, the selected magnitude of the driving current and the selected adjustment coefficient are outputted.

The AC component characteristics correspond to different driving currents, and then different driving currents are selected to drive the light-emitting unit according to the actual AC component characteristics, so that the driving current of the light-emitting unit can be adjusted adaptively. And at the same time, the amplitude characteristics or the perfusion index characteristics associated with the AC and DC component characteristics also correspond to different adjustment coefficients, which enable the analog-to-digital conversion unit to amplify the digital signal when converting the analog signal into a digital signal, so as to adapt to measurements under different physiology states to improve the measurement accuracy.

Figure 10:
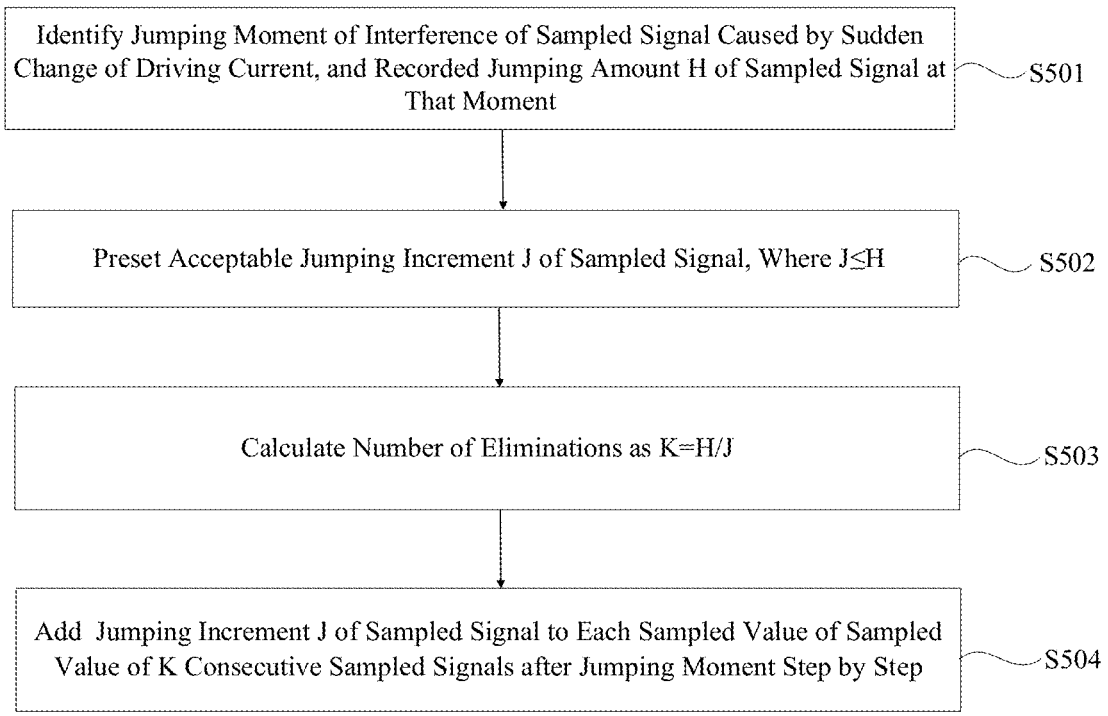
FIG. 10 is a schematic flow chart of the method for improving the measurement accuracy of the measurement system to eliminate an interference of the sampled signal caused by a sudden change of the driving current according to the present disclosure.

Since the change of the driving current causes the sampled signal to jump, it is necessary to add a sudden-change elimination function to erase the jumping characteristics. As shown in FIG. 10, the steps for eliminating an interference of the sampled signal caused by the sudden change of the driving current specifically include:

S501, the jumping moment of the sampled signal caused by the interference due to the sudden change of the driving current is identified, and the jumping amount H of the sampled signal at that moment is recorded.

S502, an acceptable jumping increment J of the sampled signal is preset, where

S503, the number of eliminations is calculated as K=H/J.

S504, the jumping increment J of the sampled signal is added to each sampled value of the K consecutive sampled signals after the jumping moment step by step.

Taking the AC component as an example, the mapping relationship between the AC component and the driving current is established to adjust the self-adaptive driving current. When a driving change is recognized, the jumping variable of the sampled signal caused by the driving change is recorded, the jumping variable is quantified into an acceptable increment, and the accumulation is completed within a unit time. For example, if the jumping variable H is 100 and the acceptable jumping increment J is 5, then the jumping variable 100 is converted to a number of K=100/5=20 consecutive adjustments, that is, for the consecutive 20 sampling points after the jumping moment, each sampling point is increased by an increment of 5 step by step. Through this method, the interference of the jumping can be eliminated, thereby achieving a smooth and free transition.

3. Logic Strategy: Eliminate Low-Frequency Interference

Figure 11:
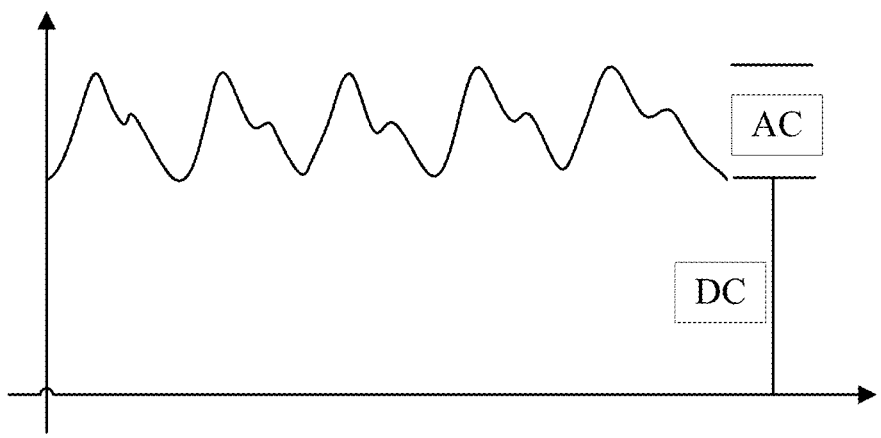
FIG. 11 is a schematic diagram of an AC component and a DC component of the sampled signal in the method for improving the measurement accuracy of the measurement system according to the present disclosure.

As shown in FIG. 11, the sampled signals of the infrared light or the sampled signals of red light are composed of two parts: a pulsating component (AC component) produced by the light absorption of pulsating blood and a non-pulsating component (DC component) produced by the light absorption of non-pulsating tissue. The pulsating component is generally changes in blood volume caused by cardiac ejection, and the non-pulsating component is generally a constant amount of bones, skins, muscles and veins.

Since the AC component and DC component of the sampled signal have low-frequency interference in the demodulated signal, an adaptive filtering mechanism is established for the demodulated signal and the adaptive filter in this logic strategy to dynamically adjust the filter window length to filter the dynamic low-frequency interference.

Figure 12:
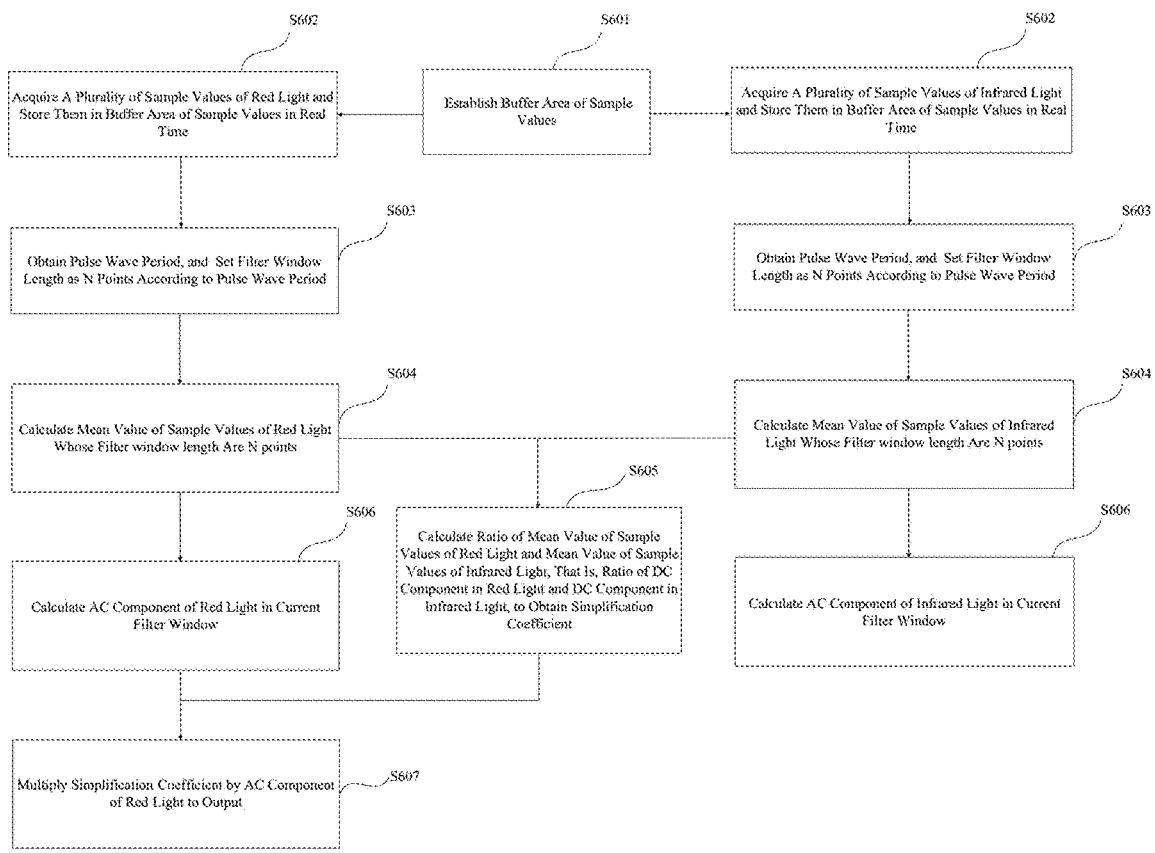
FIG. 12 is a flow chart of an adaptive smooth filtering in a logic strategy for eliminating a low-frequency interference according to the present disclosure.

Specifically, as shown in FIG. 12, the adaptive filtering mechanism includes the following steps.

S601, a buffer area of sample values is established.

S602, a plurality of sample values of red light and a plurality of sample values of infrared light are acquired and stored in the buffer area of sample values in real time.

S603, the pulse wave period is obtained, and the filter window length is set as N points according to the pulse wave period, and the length of the N points dynamically changes according to changes in the pulse wave period.

S604, a mean value of the sample values of red light whose filter window length are N points and a mean value of the sample values of the infrared light whose filter window length are N points are calculated. The mean values are equivalent to the DC component of the sample values in the current filtered window.

S605, the ratio of the mean value of the sample values of the red light to the mean value of the sample values of the infrared light is calculated, that is, the ratio of the DC component in the red light to the DC component in the infrared light is calculated. The ratio is a simplification coefficient represented as $$\frac{Ired_{DC}}{Red_{DC}},$$

which is configured to simplify the calculation of an oxygen saturation R.

S606, the AC component of the red light and the AC component of the infrared light in the current filter window is calculated according to the sample values and the mean values for filtering.

S607, the simplification coefficient is multiplied by the AC component of the red light to output. The AC component of the red light with the simplification coefficient can eliminate the DC component of the red light and the DC component of the infrared light in the calculation process of the R coefficient of oxygen saturation, thereby simplifying the calculation of R.

For example, a buffer area of 17 sample values is established, then a center point of the buffer area is the $9^{th}$ point, a length of a left side of the center point is 8 points, and a length of a right side of the center point is also 8 points. An accumulative sum on the sampled values of the buffer area is performed to calculate the average value. Then the accumulated average value is subtracted from the value of the center point ($9^{th}$ point) to obtain the filtered output result and achieve a smooth filtering. The way to achieve continuous filtering is as follows. Each time a sample value is collected, the sample value is stored in the buffer area, and the principle of first-in-last-out is adopted, that is, the first storage location of the buffer area is always the latest sample value. Each time a sample value is inputted into the buffer, the above-mentioned calculation operation is executed once, thereby realizing a real-time filtering characteristics refreshed with the sample values.

The principle of filtering is to subtract the average value of all sampling points in the entire window from the center point of the filter window. The sampling value sequence is Sample(1: 2N1+1), where i is the sampling point, N1 is a center of the sampling points, and 2N1+1=N is the length of the filter window. Sample(i) is the sample value, the center point sample value is Sample(N1), and the filter output is Filter(N1). The calculation formula is as follows:

$$\text{Filter}(N1) = \text{Sample}(N1) - \frac{\sum_{i=1}^{2N1+1} \text{Sample}(i)}{2N1+1}.$$

The AC components of the sample values of the red light and infrared light in the current filter window is calculated based on the above formula for filtering. The filtered AC component of the infrared light or the filtered AC component of the red light is calculated by the filter Filter(N1).

Figure 13:
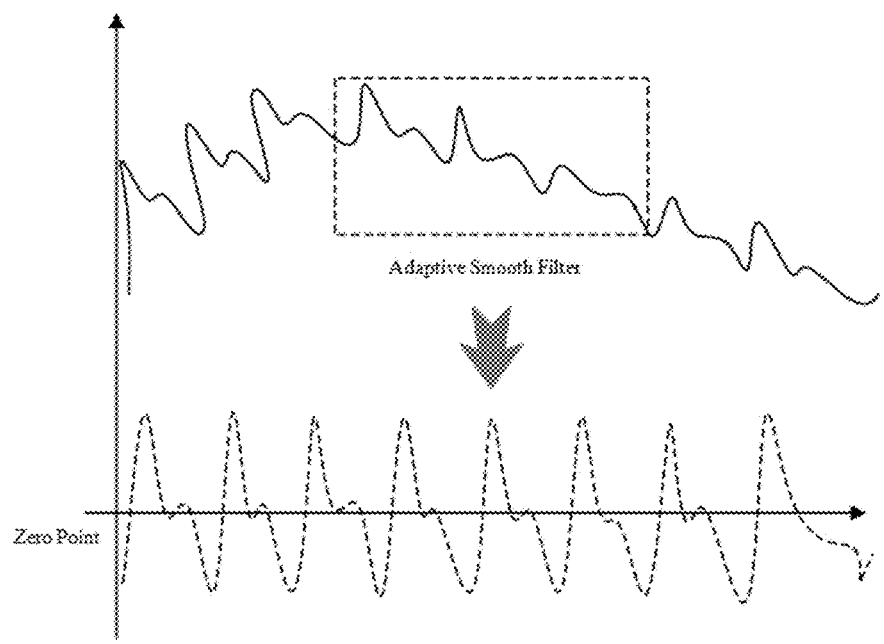
FIG. 13 is a schematic diagram of a composition of the sampled signal after adopting the adaptive smooth filtering according to the present disclosure.

As shown in FIG. 13, an adaptive smooth filtering window is designed by the above-mentioned adaptive smooth filter mechanism, and a point-by-point filtering in the process of steps S601-S607 is performed. The solid line signal in FIG. 13 is an original signal with severe baseline drift, and it becomes the signal of the dotted line in the figure after the adaptive smooth filtering. The zero point is taken as a dividing line, so that the peaks and valleys of the pulse wave can be easily identified, thereby simplifying the wave search logic. In this logic strategy, the demodulated signal is taken as the object that needs to be filtered, and the final output result is performed statistics.

For example, the pulse rate change information of the demodulated signal is performed statistics to obtain the pulse rate value. Then the smooth window length of the adaptive smooth filter is adjusted by the pulse rate value. It is assumed that the sampling rate is 100 Hz and the current pulse rate is 60 bpm, then the window length of the adaptive smooth filter is 60 s*100 Hz/60 bpm=100 sampling points. It is assumed that the pulse rate changes from 60 bpm to 120 bpm, the window length of the adaptive smooth filter is 60 s*100 Hz/120 bpm=50 sampling points. In this way, the adaptive smooth filter adjusts the filter characteristics adaptively according to the statistics of the pulse information, thereby filtering out the noise interference below the pulse rate value. For example, if the pulse rate is 60 bpm, a window length of 100 sample signals is used to filter. The filtering characteristics can be understood as eliminating low-frequency interference less than 60 bpm, that is, less than or equal to 1 Hz. If the pulse rate is 120 bpm, a window length of 50 sample signals is used to filter. The filtering characteristics can be understood as eliminating the low frequency interference less than 120 bpm, that is, less than or equal to 2 Hz.

The algorithm strategy of the algorithm processing unit 50 according to the present disclosure is also related to the accuracy of the calculation of the blood pressure saturation parameter value. There are various design methods (such as time domain algorithm, frequency domain algorithm and adaptive algorithm) in traditional algorithms, but they generally still follow the logic of filtering out noise and calculating parameters based on the oxygen saturation calculation formula. The calculation of oxygen saturation needs to first calculate the R coefficient, and then use the R coefficient to look up the table to get the oxygen saturation corresponding to the R coefficient value.

The conventional method of the traditional oximetry system is to firstly perform a noise suppression or a filtering on the signal, and then calculate the AC component and the DC component of infrared light and those of red light respectively, and then calculate the oxygen saturation coefficient based on the formula.

In the method for improving the measurement accuracy of the measurement system according to the present disclosure, the algorithm processing unit 50 calculates the oxygen saturation coefficient by the ratio of the AC component of the infrared light after adaptive filtering and the AC component of the red light with the simplification coefficient. It simplifies the calculation of the R coefficient while filtering out low-frequency interference, so that the oximetry system 100 can not only improve the recognition accuracy of the signal by adaptive filtering, so as to improve the measurement accuracy of oxygen saturation, but also simplifies the calculation formula of the oxygen saturation, so as to improve the operating efficiency of the entire algorithm.

Specifically, in the present disclosure, the calculation formula of the R coefficient is as follow:

$$R = \frac{Ired_{AC}}{Red''_{AC}}.$$

R is the oxygen saturation coefficient. $Ired_{AC}$ is the AC component of the infrared light after adaptive filtering.

$Red''_{AC}$ is the AC component of the red light with simplification coefficient after adaptive filtering.

$$Red''_{AC} = Red_{AC} * \frac{Ired_{DC}}{Red_{DC}}.$$

$Ired_{DC}$ is the DC component of the infrared light. $Red_{DC}$ is the DC component of the infrared light.

$$\frac{Ired_{DC}}{Red_{DC}}$$

is the simplification coefficient.

In this way, in the algorithm processing unit 50 of the present disclosure, the calculation of R can be performed by directly adopting $Ired_{AC}$ and $Red''_{AC}$ after adaptive filtering, thereby simplifying the calculation process of R.

In the method for improving the measurement accuracy of the measurement system of the present disclosure, the ratio of the average value in the infrared light window and the average value in the red light window is taken as the ratio of the DC component of the infrared light and the DC component of the red light, which is brought into the red light signal as a simplification coefficient, while performing the adaptive smooth filtering for the infrared light and the red light. In the subsequent algorithm processing, the parameters are calculated based on the infrared light and red light signals after adaptive filtering. Therefore, in the calculation formula of oxygen saturation, the calculation of the AC ratio of infrared light and red light after adaptive filtering is simplified after adaptive filtering, thereby greatly reducing the complexity of algorithm and improving operating efficiency. From a perspective of improving the signal-to-noise ratio, it is proposed a simple and feasible de-noise method, which not only can effectively remove low-frequency interference, but also simplifies the processing flow of the entire algorithm, making the algorithm run more concise and efficient. In summary, the present disclosure optimizes the signal-to-noise ratio for each key link of the analog-to-digital conversion unit 30, the driving adjustment unit 40, and the algorithm processing unit 50 of the measurement system 100. The signal-to-noise ratio optimization module 31 of the analog-to-digital conversion unit 30 is used to eliminate high-frequency noise, improve sampling accuracy and eliminate low-frequency interference under the logic strategy. The driving adjustment unit adjusts the driving current of the light-emitting unit based on the digital signal processed by the signal-to-noise ratio optimization module 31, and the algorithm processing unit perform a conversion and calculation of physiological parameters based on the digital signal processed by the signal-to-noise ratio optimization module 31. The above-mentioned optimization schemes for the signal-to-noise ratio of the above several links can be used alone or in combination to improve the signal-to-noise ratio of the entire measurement system 100, thereby improving the measurement accuracy of the entire measurement system 100.

Described above are some embodiments of the present disclosure, which do not limit the scope of the present disclosure. Under the inventive concept of the present disclosure, any equivalent structural transformations made using the contents of the description and drawings of the present disclosure, or direct/indirect application in other related technical fields are included in the protection scope of patent of the present disclosure.

What is claimed is:

1. A method for improving a measurement accuracy of a measurement system, applied to an oximetry system, which comprises a light-emitting unit, a photoelectric conversion unit, an analog-to-digital conversion unit, a driving adjustment unit and an algorithm processing unit, wherein the analog-to-digital conversion unit comprises a signal-to-noise ratio optimization module, the method comprising:

emitting, by the light-emitting unit, at least one light signal to penetrate a human tissue;

receiving, by the photoelectric conversion unit, the at least one light signal emitted by the light-emitting unit after penetrating the human tissue, and converting the at least one light signal into an electrical signal, wherein the electrical signal comprises at least one physiological signal characteristic in the human tissue, and is sent to the analog-to-digital conversion unit;

converting, by the analog-to-digital conversion unit, the electrical signal into a digital signal;

optimizing, by the signal-to-noise ratio optimization module, a signal-to-noise ratio of the digital signal by establishing a plurality of logic strategies based on at least two of four elements comprising a carrier signal, a modulated signal, a demodulated signal and a filter, outputting an adjustment coefficient to the driving adjustment unit, and outputting an optimized digital signal to the algorithm processing unit, and the filter is at least one type of a low-pass filter, a high-pass filter, a band-pass filter, a band-stop filter and an adaptive filter;

adjusting, by the driving adjustment unit, a magnitude of a driving current of the light-emitting unit based on the adjustment coefficient generated by the signal-to-noise ratio optimization module through the digital signal processed by the at least one logic strategy, and controlling the light-emitting unit to alternately emit light to form the modulated signal obtained by the photoelectric conversion unit, wherein the oximetry system is based on an alternate light-emitting strategy of red light and infrared light, and the modulated signal obtained by the photoelectric conversion unit is formed by controlling the light-emitting unit to emit light alternately; and performing, by the algorithm processing unit, a physiological parameter conversion and calculation based on the digital signal processed by the at least one logic strategy of the signal-to-noise ratio optimization module to obtain at least one physiological parameter, and demodulating the digital signal to obtain an effective physiological signal, wherein an effective physiological signal is obtained by the demodulated signal;

wherein the plurality of logic strategies comprise:

a first logic strategy to eliminate a high-frequency noise: a frequency of the carrier signal being at least four times a cut-off frequency of the low-pass filter, and the cut-off frequency of the low-pass filter being at least four times a frequency of the modulated signal, and the low-pass filter configured to filter the carrier signal to eliminate a high-frequency interference of the modulated signal;

a second logic strategy to improve a sampling accuracy: establishing an adaptive width adjustment mechanism based on the modulated signal and the demodulated signal, wherein in the adaptive width adjustment mechanism, a pulse width of the modulated signal adaptively increases or decreases, and the demodulated signal adaptively compensates accuracy according to a change of the pulse width;

a third logic strategy to eliminate low-frequency interference: establishing an adaptive filtering mechanism based on the demodulated signal and the adaptive filter, wherein in the adaptive filtering mechanism, a window length of the adaptive filter is dynamically adjusted.

2. The method for improving the measurement accuracy of the measurement system of claim 1, wherein the plurality of logic strategies, further comprise a fourth logic strategy: establishing an adaptive amplitude adjustment mechanism based on the modulated signal and the demodulated signal, wherein in the adaptive amplitude adjustment mechanism, an amplitude of the modulated signal adaptively increases or decreases, and the demodulated signal adaptively compensates an accuracy based on a change of the amplitude; or in the signal-to-noise ratio optimization module, a length of the pulse width of the modulated signal is adaptively increased or decreased in a following manner:

a sampling point corresponds to a time unit, which is pulse width information, when a number of sampling points increases or decreases, the length of the pulse width of the modulated signal also increases or decreases accordingly, an adjustment of a length of a sampling pulse width, or an average number of sampling values depends on a feedback of a final output result of the signal-to-noise ratio optimization module;

based on the final output result, amplitude characteristics or perfusion index characteristics are calculated to actually lengthen or shorten of the pulse width; and the demodulated signal adaptively compensates the accuracy based on a change of the pulse width; and taking a maximum driving pulse width as a reference to construct a driving pulse width adjustment system in a reverse direction comprises:

a number of sampling points of the driving pulse width is multiplied by the adjustment gain to expand to a number of sampling points of the maximum driving pulse width, and taking a cumulative sum as an final output; and automatically compensating the accuracy when sampling values obtained from the driving pulse width are insufficient.

3. The method for improving the measurement accuracy of the measurement system of claim 1, wherein the establishing an adaptive width adjustment mechanism based on the modulated signal and the demodulated signal in the second logic strategy to improve the sampling accuracy comprises:

obtaining an AC component and a DC component by performing an AC and DC separation processing on an acquired sampled signal;

calculating an amplitude characteristic or a perfusion index characteristic based on the AC component and the DC component; and adjusting an increase or a decrease of an actual pulse width of the modulated signal based on the amplitude characteristic or the perfusion index characteristic.

4. The method for improving the measurement accuracy of the measurement system of claim 3, wherein the adjusting the increase or the decrease of the actual pulse width of the modulated signal comprises:

establishing a mapping relationship between the amplitude characteristic or the perfusion index characteristic and the adjustment coefficient;

determining whether there is interference in the sampled signal;

maintaining a current sampling pulse width to output, if there is interference;

selecting one adjustment coefficient matching a current amplitude characteristic or the perfusion index characteristic, if there is no interference; and adjusting a sampling pulse width of an output by the selected adjustment coefficient.

5. The method for improving the measurement accuracy of the measurement system of claim 1, wherein the second logic strategy for improving the sampling accuracy in the signal-to-noise ratio optimization module further comprises an adaptive adjustment of a magnitude of the driving current, the adaptive adjustment comprising:

eliminating an interference of the sampled signal caused by a sudden change of the driving current;

obtaining a AC component and a DC component by performing an AC and DC separation processing on the acquired sampled signal;

calculating an amplitude characteristic or a perfusion index characteristic based on the AC component and the DC component; and adjusting an increase or a decrease of an actual magnitude of the driving current according to the amplitude characteristic or the perfusion index characteristic.

6. The method for improving the measurement accuracy of the measurement system of claim 5, wherein the adjusting an increase or a decrease of an actual magnitude of the driving current according to the amplitude characteristic or the perfusion index characteristic comprises:

establishing a mapping relationship between the amplitude characteristic or the perfusion index characteristic and the adjustment coefficient;

establishing a mapping relationship between the AC component and the magnitude of the driving current;

determining whether there is an interference in the sampled signal;

maintaining a current driving current to output, if there is interference;

selecting an adjustment coefficient matching a current amplitude characteristic or the perfusion index characteristic, and selecting a magnitude of the driving current matching a current AC component and a current DC component, if there is no interference; and outputting the selected magnitude of the driving current and the selected adjustment coefficient.

7. The method for improving the measurement accuracy of the measurement system of claim 4, wherein the determining whether there is an interference in the sampled signal comprises:

determining a consistency of amplitudes of at least three pulse waves;

determining a consistency of periods of the at least three pulse waves;

determining whether an amplitude standard deviation of the pulse waves exceeds a preset ratio of an amplitude mean value;

determining whether a period standard deviation of the pulse waves exceeds a preset ratio of a period mean value; and confirming that there is an interference, if any of the four determinations are not met.

8. The method for improving the measurement accuracy of the measurement system of claim 5, wherein the eliminating the interference of the sampled signal caused by a sudden change of the driving current comprises:

identifying a jumping moment of the sampled signal caused by the interference due to the sudden change of the driving current, and recording a jumping variable H of the sampled signal at the jumping moment;

presetting an acceptable jumping increment J of the sampled signal, $J \leq H$;

calculating a number of eliminations: $K=H/J$; and adding the jumping increment J of the sampled signal to each sampled value of continuous K sampled signals after the jumping moment step by step.

9. The method for improving the measurement accuracy of the measurement system of claim 1, wherein the light-emitting unit emits at least red light and infrared light, and the establishing an adaptive filtering mechanism based on the demodulated signal and the adaptive filter in the third logic strategy for eliminating low-frequency interference comprises:

establishing a buffer area of sample values;
obtaining a plurality of sample values of the red light and a plurality of sample values of the infrared light, and storing the sample values in the buffer area of sample values in real time;
acquiring a pulse wave period, and setting the window length of the adaptive filter as N points according to the pulse wave period, wherein a length of the N points dynamically changes according to a change of the pulse wave period;
calculating a mean value of the sample values of the red light and a mean value of the sample values of the infrared light while the window length of the filter with N points, wherein the mean values are equivalent to a DC component of a sample value in a current filter window;
calculating a ratio of the mean value of sample values of the red light to the mean value of sample values of the infrared light, wherein the ratio is a ratio of a DC component of the red light and a DC component of the infrared light, and the ratio is a simplification coefficient;
calculating an AC component of the red light and an AC component of the infrared light in the current filter window according to the sample values and the mean value, so as to perform filtering; and
multiplying the simplification coefficient by the AC component of the red light to output.

10. The method for improving the measurement accuracy of the measurement system of claim 9, further comprising:
calculating, by the algorithm processing unit, an oxygen saturation coefficient based on a ratio of an AC component of the infrared light after adaptive filtering to an AC component of the red light with the simplification coefficient.

11. An oximetry system, comprising:
a light-emitting unit, configured to emits at least one light signal to penetrate a human tissue;
a photoelectric conversion unit, configured to receive the at least one light signal emitted by the light-emitting unit after penetrating the human tissue and convert the at least one light signal into an electrical signal and send the electrical signal to an analog-to-digital conversion unit, wherein the electrical signal comprises at least one physiological signal characteristic in the human tissue;
the analog-to-digital conversion unit, connected to the photoelectric conversion unit, configured to perform an analog-to-digital conversion on the electrical signal to generate a digital signal, wherein the analog-to-digital conversion unit is provided with a signal-to-noise ratio optimization module;
the signal-to-noise ratio optimization module configured to optimize the signal-to-noise ratio of the digital signal by establishing at least one of a plurality of logic strategies based on at least two of four elements comprising a carrier signal, a modulated signal, a demodulated signal and a filter, and output an adjustment coefficient required by a driving adjustment unit, and wherein the optimized digital signal is transmitted to an algorithm processing unit, and the adjustment coefficient is transmitted to the driving adjustment unit, wherein and the filter is at least one type of a low-pass filter, a high-pass filter, a band-pass filter, a band-stop filter and an adaptive filter, and the modulated signal obtained by the photoelectric conversion unit is formed by controlling the light-emitting unit to emit light alternately;
the driving adjustment unit, connected to the light-emitting unit and the analog-to-digital conversion unit, configured to adjust a magnitude of the driving current of the light-emitting unit based on the adjustment coefficient generated by the signal-to-noise ratio optimization module through the processed digital signal;
an algorithm processing unit, connected to the analog-to-digital conversion unit, configured to perform a conversion and calculation on physiological parameters based on the digital signal processed by the signal-to-noise ratio optimization module, wherein an effective physiological signal is obtained by the demodulated signal;
a communication unit, connected to the algorithm processing unit and a display unit, configured to send the physiological parameter information calculated by the algorithm processing unit to the display unit; and
the display unit, configured to display the received physiological parameter information after an in-depth processing;
wherein the plurality of logic strategies comprise:
a first logic strategy to eliminate a high-frequency noise: a frequency of the carrier signal being at least four times a cut-off frequency of the low-pass filter, and the cut-off frequency of the low-pass filter being at least four times a frequency of the modulated signal, and the low-pass filter configured to filter the carrier signal to eliminate a high-frequency interference of the modulated signal;
a second logic strategy to improve a sampling accuracy: establishing an adaptive width adjustment mechanism based on the modulated signal and the demodulated signal, wherein in the adaptive width adjustment mechanism, a pulse width of the modulated signal adaptively increases or decreases, and the demodulated signal adaptively compensates accuracy according to a change of the pulse width;
a third logic strategy to eliminate low-frequency interference: establishing an adaptive filtering mechanism based on the demodulated signal and the adaptive filter, wherein in the adaptive filtering mechanism, a window length of the adaptive filter is dynamically adjusted.

12. The method for improving the measurement accuracy of the measurement system of claim 1, wherein the digital signal through which the driving adjustment unit adjusts the adjustment coefficient is processed by the first logic strategy; and
wherein the digital signal on which the algorithm processing unit performs the physiological parameter conversion and calculation based is processed by the third logic strategy.

13. The method for improving the measurement accuracy of the measurement system of claim 6, wherein a determination of the adjustment coefficient comprises:
obtaining a maximum width M1 of a light-emitting pulse;
obtaining an actual width M2 of the light-emitting pulse;
calculating a gain coefficient P matched with the light-emitting pulse by $P=M1/M2$;
obtaining a calibration coefficient based on the perfusion index, the AC component and the DC component; and
selecting the adjustment coefficient based on the gain coefficient P and calibration coefficient.

14. The method for improving the measurement accuracy of the measurement system of claim 7, wherein the preset ratio of the amplitude mean value is 25%, and the preset ratio of the period mean value is 25%.

15. The method for improving the measurement accuracy of the measurement system of claim 1, wherein the steps for the demodulated signal adaptively compensating accuracy according to a change of the pulse width comprise:
   obtaining a maximum driving pulse width;
   determining a number of sampling points based on the maximum driving pulse width; and
   automatically supplementing sampling points when sampling points of a current driving pulse width is less than the number of sampling points based on the maximum driving pulse width.

16. The method for improving the measurement accuracy of the measurement system of claim 15, wherein the automatically supplementing sampling points when sampling points of a current driving pulse width is less than the number of sampling points based on the maximum driving pulse width comprises:
   multiplying a number of sampling points of the current driving pulse width by an adjustment gain to expand to the number of the sampling points corresponding to the maximum driving pulse width; and calculating a cumulative sum of sampling points as a sampling output.

17. The method for improving the measurement accuracy of the measurement system of claim 16, wherein the adjustment gain is calculated as: (the number of the sampling points corresponding to the maximum driving pulse width)/(the number of the sampling points of the current driving pulse width).

18. The method for improving the measurement accuracy of the measurement system of claim 9, wherein a formula for the adaptive filter is:

$$\text{Filter}(N1) = \text{Sample}(N1) - \frac{\sum_{i=1}^{2N1+1} \text{Sample}(i)}{2N1+1}$$

wherein i is sampling point, N1 is a center point of the sampling points, (2N1+1) is the length of the filter window, Sample (i) is the sample value, Sample (N1) is the sample value of the center point, and Filter (N1) is output of the adaptive filter.

19. The method for improving the measurement accuracy of the measurement system of claim 10, wherein an oxygen saturation is calculated based on the oxygen saturation coefficient R, wherein a calculation formula of the oxygen saturation coefficient R is:

$$R = \frac{Ired_{AC}}{Red''_{AC}};$$

$$Red''_{AC} = Red_{AC} * \frac{Ired_{DC}}{Red_{DC}};$$

wherein $Ired_{AC}$ is the AC component of the infrared light after adaptive filtering, $Red''_{AC}$ is the AC component of the red light with simplification coefficient after adaptive filtering, $Ired_{DC}$ is the DC component of the infrared light, $Red_{DC}$ is the DC component of the infrared light, and $$\frac{Ired_{DC}}{Red_{DC}}$$

is the simplification coefficient.

* * * * *